US008598486B2

(12) United States Patent
Kim et al.

(10) Patent No.: US 8,598,486 B2
(45) Date of Patent: Dec. 3, 2013

(54) METHOD FOR TREATING RETURN ORES USING PLASMA

(71) Applicant: Posco, Kyungsangbook-do (KR)

(72) Inventors: Shin Il Kim, Jeollanam-do (KR); Joo Kang, Jeollanam-do (KR); Jong Nam Lee, Jeollanam-do (KR); Won Hee Lee, Gyunggi-do (KR)

(73) Assignee: Posco, Pohang (KR)

( * ) Notice: Subject to any disclaimer, the term of this patent is extended or adjusted under 35 U.S.C. 154(b) by 0 days.

(21) Appl. No.: 13/651,492

(22) Filed: Oct. 15, 2012

(65) Prior Publication Data

US 2013/0098209 A1 Apr. 25, 2013

Related U.S. Application Data

(62) Division of application No. 12/520,176, filed as application No. PCT/KR2007/006768 on Dec. 21, 2007, now Pat. No. 8,287,802.

(30) Foreign Application Priority Data

Dec. 22, 2006 (KR) ........................ 10-2006-0133199

(51) Int. Cl.
*B23K 10/00* (2006.01)
*H05H 1/34* (2006.01)

(52) U.S. Cl.
USPC ............ 219/121.36; 219/121.59; 219/121.38; 219/121.37; 219/121.58; 75/246; 75/250; 373/22

(58) Field of Classification Search
CPC ....................................................... B23K 10/00
USPC ............. 219/121.36, 121.59, 121.49, 121.51, 219/121.43; 373/18–22; 75/746, 750–759, 75/765, 773, 961
See application file for complete search history.

(56) References Cited

U.S. PATENT DOCUMENTS 1,522,098 A 1/1925 Breyer et al.
3,133,812 A 5/1964 Olav (Continued)

FOREIGN PATENT DOCUMENTS

JP 53083904 A 7/1978
JP 11217606 A 8/1999

(Continued)

OTHER PUBLICATIONS

Database WPI, Week 198932, XP002613361, SE 8 704 329, May 6, 1989, SSAB Svenski Stal AB.

*Primary Examiner* — Mark Paschall
(74) *Attorney, Agent, or Firm* — The Webb Law Firm

(57) ABSTRACT

A method and an apparatus for treating return ores using plasma, capable of treating sintered return ores generated in a sintering process in a steel maker or return ores (iron ores) employed in other ironmaking process such as FINEX. The method of treating return ores using plasma includes: providing return ores sorted out by a sorting process; and bonding the return ores by fusing and agglomerating the return ores using plasma. Also, an apparatus for treating return ores using plasma includes a plasma heating device used to fuse and agglomerate sorted return ores. The return ores of a predetermined grain size are fusion-bonded and agglomerated using a flame of a plasma heating device. Particularly, the return ores can be treated in a massive amount to enhance productivity of a fusion-bonding process of the return ores. Furthermore, a great amount of sintered return ores generated in the sintering process can be subjected to a fewer number of re-treatment processes.

8 Claims, 13 Drawing Sheets

(56) References Cited

U.S. PATENT DOCUMENTS

| | | | | |
|---|---|---|---|---|
| 3,960,544 | A | 6/1976 | Tylko | |
| 4,577,838 | A | 3/1986 | Mathiesen | |
| 4,884,625 | A | 12/1989 | Paton et al. | |
| 5,263,689 | A | 11/1993 | Menzies et al. | |
| 5,282,880 | A | 2/1994 | Olson | |
| 5,439,505 | A * | 8/1995 | Krofchak | 75/773 |
| 5,497,710 | A | 3/1996 | Camacho | |
| 6,063,160 | A * | 5/2000 | Krogerus et al. | 75/757 |
| 6,676,725 | B2 * | 1/2004 | Aota et al. | 75/246 |
| 2001/0047699 | A1 * | 12/2001 | Hoffman et al. | 75/765 |
| 2002/0170388 | A1 * | 11/2002 | Marcheze | 75/319 |
| 2003/0041693 | A1 * | 3/2003 | Roe | 75/758 |
| 2008/0006954 | A1 | 1/2008 | Yubuta et al. | |

FOREIGN PATENT DOCUMENTS

| | | | |
|---|---|---|---|
| JP | 2000018551 | A | 1/2000 |
| JP | 2000026156 | A | 1/2000 |
| JP | 2009076458 | A | 4/2009 |
| JP | 49067802 | A | 10/2012 |
| KR | 20010016692 | A | 3/2001 |
| KR | 20010057130 | A | 7/2001 |
| WO | 0108795 | A1 | 2/2001 |

* cited by examiner

PRIOR ART (a)

METHOD FOR TREATING RETURN ORES USING PLASMA

CROSS REFERENCE TO RELATED APPLICATIONS

This application is a division of U.S. patent application Ser. No. 12/520,176 filed Jun. 19, 2009, which is a national phase filing of PCT/KR2007/006768 filed Dec. 21, 2007, which claims priority to Korean Application No. 10-2006-0133199 filed Dec. 22, 2006, all of which are incorporated by reference herein in their entireties.

BACKGROUND OF THE INVENTION

1. Field of the Invention

The present invention relates to a method and an apparatus for treating return ores, and more particularly, to a method and an apparatus for treating return ores using plasma, in which return ores of a predetermined grain size are fusion bonded and agglomerated by a flame of a plasma heating device, and the return ores are treated in a massive amount to enhance a fusion bonding process of the return ores, while a great amount of sintered return ores generated in a sintering process are subjected to a fewer number of re-treatment processes.

2. Description of Related Art

Iron ore contains 30 to 70% iron (Fe), and good-quality iron ore is small in the amount of hazardous components such as sulfur (S), phosphor (P), and copper (Cu) and uniform in size. However, the iron ore produced in an original place is not uniform in components thereof and thus cannot be directly put into a blast furnace. Generally, the iron ore is charged into the blast furnace as a sintered ore by making the components thereof uniform, mixing the resultant iron ore with corks and sintering the same.

FIG. 1 illustrates a general method of manufacturing a sintered ore.

That is, as shown in FIG. 1, various kinds of iron ore as a major material of the sintered ore and silicastone, serpentinite, and limestone as a minor material, and stone coal and corks as a fuel are transferred from a storage bin 110 through a conveyor to a mixer 120.

Also, the material, fuel, and ores are mixed together in the mixer 120 and granulated with moisture added thereto, and then fed to a surge hopper 130.

Then, the surge hopper 130 supplies sintering materials fed from the mixer 120 to a sintering trolley 140 at a predetermined ratio. Sintering materials are supplied first by an upper ore hopper 150 installed behind the surge hopper 130 to be sintered before the sintering materials stored in the surge hopper 130 are supplied.

Moreover, an ignition furnace 160 disposed before the surge hopper 130 ignites an upper portion of the sintering materials on the sintering trolley 140. The ignited upper portion of the sintering materials is sintered together with a lower portion thereof by virtue of a suction force of a wind box 170 including an air exhauster 172 and a chamber 174 below the sintering trolley 140.

Then, the sintered materials are transported forward along the sintering trolley 140, thrown into a cooler 180 to be cooled in air, and then manufactured as a sintered ore.

Thereafter, the sintered ore produced is crushed by a crusher 190. The crushed sintered ore is separated into a return ore (sintered return ore) with a grain size of 6 mm or less and a sintered ore with a greater grain size by a hot screen 200.

For example, the sintered ore with a grain size of 6 mm or less is not sent to the blast furnace 210, but returned to the sintering process. Such a sintered ore is generally referred to as a "return ore".

That is, the sintered ore usable in the blast furnace has a grain size of about 6 to 50 mm, and thus the sintered ore with a grain size of 6 mm or less is re-thrown into the surge hopper 130 as indicated with line A of FIG. 1.

Meanwhile, even though not illustrated in detail in FIG. 1, the sintered ore having a grain size (diameter) of greater than 6 mm is cooled and then crushed at a predetermined ratio by a cutting feeder. Also, the sintered ore with a diameter of 50 mm or more is crushed up to 50 mm, which is a size allowing the sintered ore to be charged into the blast furnace. The sintered ore is finally put into the blast furnace 210 through several sorting processes using a screen, as indicated with line B of FIG. 1.

However, typically, the return ore having a grain size of 6 mm or less accounts for a considerable proportion, i.e., about 40% of the sintered ores generated in an actual sintering process. But such a return ore can not be directly charged into the blast furnace to ensure permeability and is subjected back to the sintering process.

Therefore, the return ores (sintered return ores) may be agglomerated (fusion-bonded) to a grain size (diameter) of greater than 6 mm to be charged into the blast furnace. This accordingly precludes a need for a process of re-treating the return ores, which requires the return ores to be subjected back to the sintering process.

Meanwhile, to agglomerate the return ores to a grain size of greater than 6 mm, a question of how to physically bond (fuse) the return ores should be solved. There are some known methods to be considered as follows.

To begin with, the return ores may be bonded using a binder, which is a medium for bonding the return ores. With this binder, the return ores can be advantageously bonded in a cooling state without a need for pre-heating the return ores. However, disadvantageously, the binder for bonding the return ores is typically weak to heat and lost when put into the blast furnace. Thus, the agglomerated return ores are very likely to be broken into small grains in the blast furnace.

Next, a commercially viable laser may be employed. However, the laser is capable of fusing a very small effective area (radius) of the return ores, thus not productively feasible when fusion-bonding the return ores. Besides, an actual test found that the return ores are weakly bonded by the laser.

Another alternative method involves thermal spray welding, in which spray powder is sprayed onto an object to perform welding. In this case, the return ores are excellently bonded but the spray powder adversely affects molten iron components in the blast furnace process, thus hardly applicable in practice.

Finally, an ultrasonic metal pressing for bonding non-iron metal and plastic may be adopted. In the ultrasonic metal pressing, a friction force is generated on contact surfaces due to vibration to thereby bond the return ores. However, the bonded return ores have rough surfaces and may be fractured by a predetermined pressure imposed.

Thus, the applicant of the present invention has come to suggest a technology for agglomerating the return ores through more effective fusion binding. This technology allows the return ores to be agglomerated with a uniform size and the sintered ores to meet quality standard. Particularly, with this technology, the return ores remain strongly bonded even after fusion binding, posing no difficulty to a process flow until the return ores are charged into the blast furnace and the return ores can be treated in a massive amount.

Meanwhile, only sintered return ores have been described as an example of the return ores. However, the method of treating return ores of the present invention may be applied to other ironmaking processes such as commercially viable FINEX or COREX which has overcome problems associated with manufacturing costs in sintering ores and environmental pollution in the blast furnace process, using non-coking coal and iron ores.

The present invention has been made to solve the foregoing problems of the prior art and therefore an aspect of the present invention is to provide a method and apparatus for treating return ores using plasma, capable of fusion binding and agglomerating the return ores to a predetermined grain size using a flame of a plasma heating device.

Another aspect of the present invention is to provide a method and apparatus for treating return ores using plasma, in which the return ores can be treated in a massive amount to enhance productivity of agglomerating the return ores through fusion-bonding and also a great amount of sintered return ores generated in the sintering process are subjected to a fewer number of re-treatment processes.

SUMMARY OF THE INVENTION

According to an aspect of the invention, the invention provides a method of treating return ores using plasma, the method including: providing return ores sorted out by a sorting process; and bonding the return ores by fusing and agglomerating the return ores using plasma.

The method may further include: preheating the return ores fed through the sorting process before bonding the return ores; heat-retaining agglomerated return ore lumps by slowly cooling the return ore lump after bonding the return ores to maintain bonding strength, and blocking the return ore lumps from contact with air to prevent oxidization thereof; and screening the return ore lump with a predetermined grain size while checking bonding strength of the return ore lumps.

The return ores may be successively transferred via a transfer unit and agglomerated by a plasma heating device to be treated in a massive amount.

The return ores may be sintered ores with a grain size of 6 mm or less sorted through the sorting process after sintering is completed or return ores put into a melter-gasifier of an ironmaking process using non-coking coal and iron ore fines.

The plasma heating device may include a plurality of plasma heating devices arranged in rows to treat the return ores in a massive amount.

Further return ores may be covered over the return ore lumps after the bonding of the return ores to retain heat and prevent oxidization thereof.

The return ores may be successively fed in multi-layers in such a way that the return ores are fusion-bonded step-wise from a lowermost layer to an uppermost layer to be treated in a massive amount.

According to another aspect of the invention, the invention provides an apparatus for treating return ores using plasma, the apparatus including a plasma heating device used to fuse and agglomerate sorted return ores.

The plasma heating device may include: a plasma generator; a gas supplier; and a plasma torch associated with the plasma generator and the gas supplier to generate a plasma flame for fusion-bonding the return ores.

The apparatus may further include a plasma torch protection tool comprising a guide hole guiding the flame generated from the plasma torch and a flame angle adjusting portion having a diameter increased toward an exit of the guide hole, the plasma torch protection tool configured to allow the plasma flame generated from the torch to be guided inwardly to pass therethrough.

The apparatus may further include a transfer unit disposed below the plasma heating device to enable the return ores to be treated in a massive amount.

The transfer unit may include: a conveyor moved on an endless track from below the plasma heating device; and unit blocks disposed successively on the conveyor to house the return ores therein.

The plasma heating device may include a plurality of plasma heating devices disposed above the transfer unit in rows, and the transfer unit is increased in width correspondingly.

The plasma heating device may include a plurality of plasma heating devices disposed in a step configuration to fusion-bond the return ores from a lowermost to an uppermost step of the transfer unit, and the transfer unit is increased in height correspondingly.

The apparatus may further include: a sealer having an external member disposed above the transfer unit to correspond to a length of the transfer unit and a fire-proof block layer disposed on a bottom of the external member and retains heat, wherein the plasma heating device is disposed through the sealer.

As described above, according to a method and apparatus for treating return ores using plasma of the present invention, sintered return ores or ores of a predetermined grain size are easily fusion-bonded into a mass using plasma.

Particularly, according to the present invention, the return ores are successively charged and transferred so as to be agglomerated in a massive amount, thereby enhancing productivity of agglomerating the return ores overall.

In addition, the return ores are excellently fusion-bonded and thus prevented from being easily fractured when put into a blast furnace, thereby facilitating a blast furnace process.

DESCRIPTION OF THE PREFERRED EMBODIMENTS

Exemplary embodiments of the present invention will now be described in detail with reference to the accompanying drawings.

Figure 1:
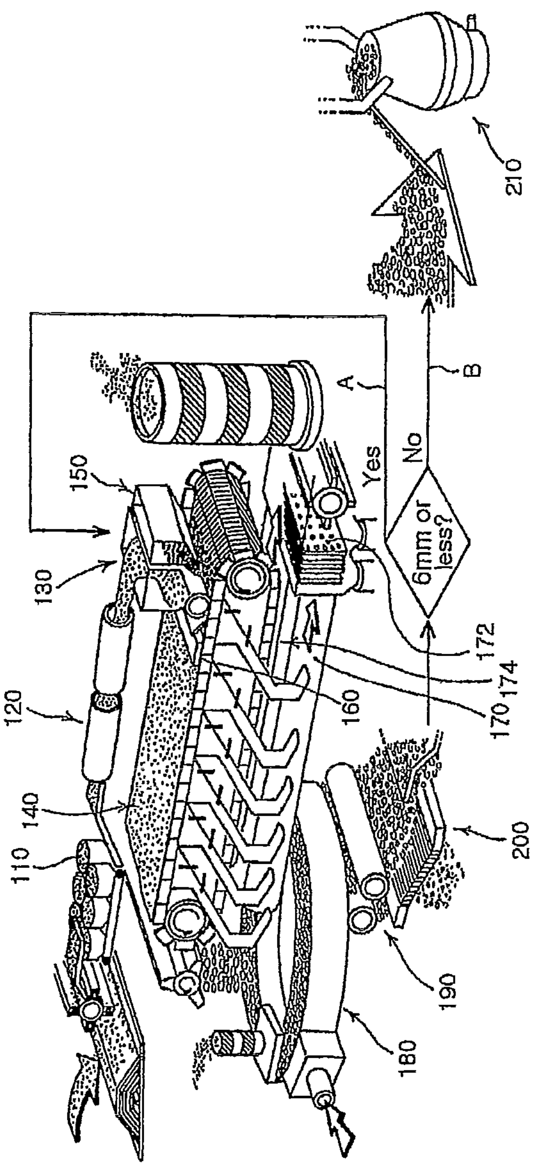
FIG. 1 is a schematic view illustrating a conventional process of treating sintered return ores generated during sintering.
Figure 2:
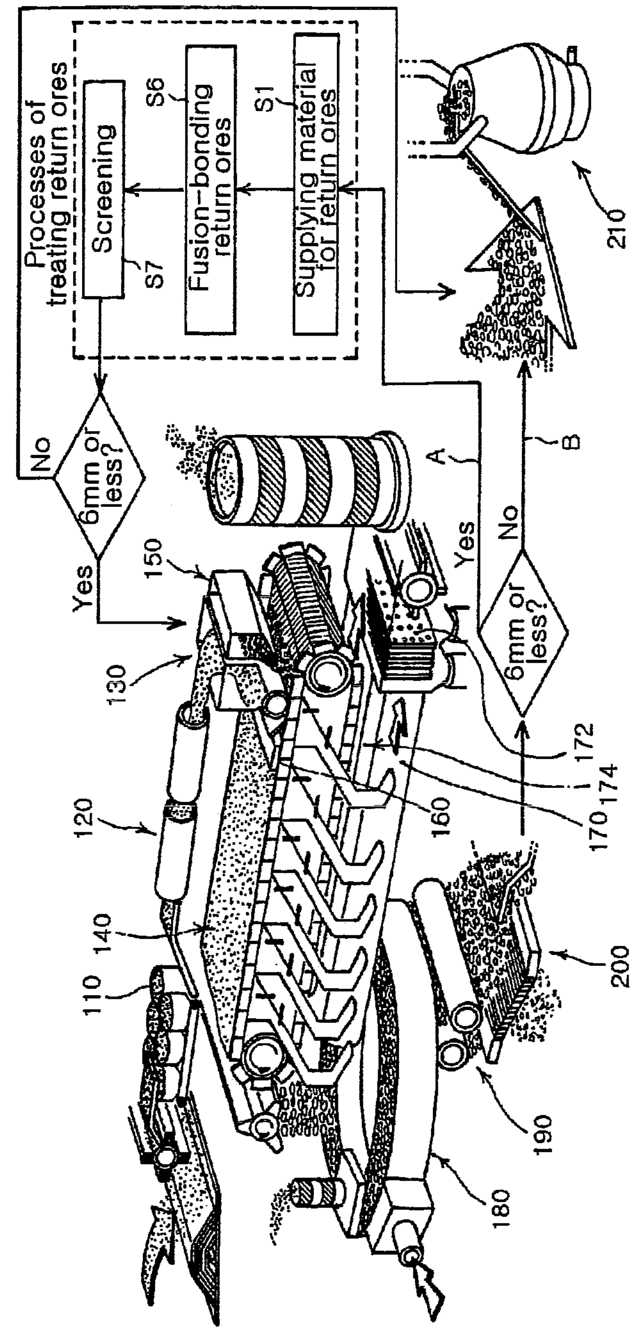
FIG. 2 is a schematic view illustrating a process of treating return ores during sintering according to an exemplary embodiment of the invention.

First, FIG. 2 illustrates a process of treating return ores according to an exemplary embodiment of the invention, in view of a sintering process of FIG. 1.

In FIG. 2, the same sintering process and blast furnace as described in FIG. 1 will be designated with the same reference numeral and not be described in any further detail.

Also, description of FIG. 2 is based on return ores generated in the sintering process, i.e., sintering ores with a grain size of 6 mm or less. However, as described above, a method (process) or an apparatus 1 for treating return ores, which will be described in detail later, can be applied to other ironmaking processes such as FINEX or COREX in which molten iron is produced using non-coking coal and iron ore fines.

In this case, not sintered return ores but return ores with a predetermined grain size or less may be employed.

Furthermore, according to a feature of the present invention, as described above, out of return ores manufactured in the sintering process, the sintered ores with a grain size of greater than 6 mm are put into a blast furnace 210. Meanwhile, as for the sintered ores having a grain size of 6 mm or less, the return ores are agglomerated by a treatment method of return ores including bonding of the return ores, in which the return ores are fusion-bonded and agglomerated. Here, such agglomerated return ore lumps are directly charged into the blast furnace 210.

Figure 4:
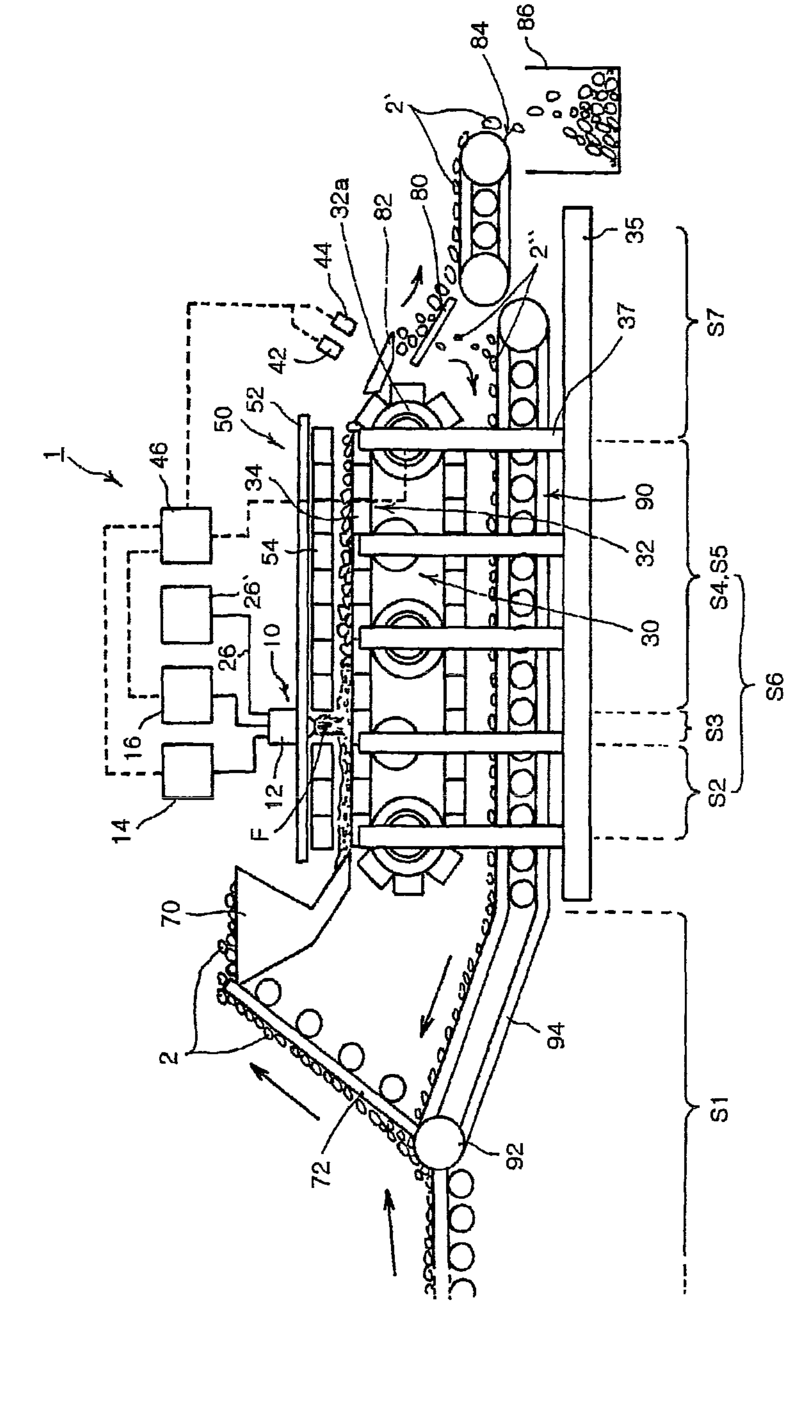
FIG. 4 is an overall configuration view illustrating a process and apparatus for treating return ores in a massive amount according to an exemplary embodiment of the invention.

Particularly, as shown in FIG. 4 which will be described in detail later, the process and apparatus for treating return ores enables the return ores to be agglomerated in a massive amount.

First, in the method for treating the return ores of the present embodiment, basically, out of the sintered ores produced in the sintering process, the return ores with a grain size of 6 mm or less are sorted out by a screen 200 of FIG. 2 to be treated.

Figure 3:
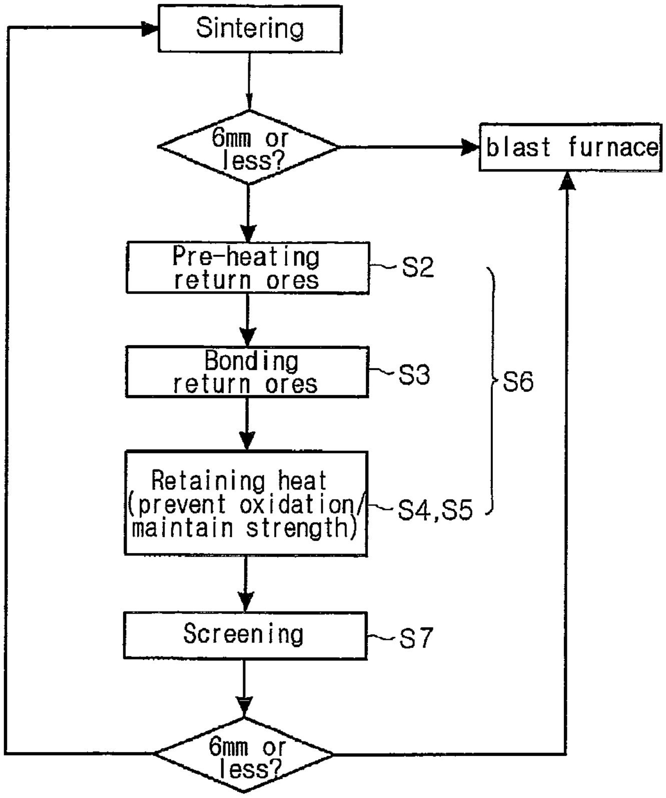
FIG. 3 is a flow chart illustrating a basic process of treating return ores according to an exemplary embodiment of the invention.

Meanwhile, FIG. 3 illustrates a basic process for treating return ores according to an exemplary embodiment of the invention.

As shown in FIG. 3, the method for treating return ores of the present embodiment includes preheating the return ores (S2), bonding the return ores by fusion-bonding and agglomerating the return ores (S3), heat-retaining the agglomerated return ore lumps (S4, 5) to maintain strength (S4) of the return ore lumps and preventing oxidization (S5), and finally screening the return ore lumps with such a grain size as can be put into the blast furnace while maintaining strength (S7).

Here, referring to FIGS. 2 to 4, 'S6' is an integrated process of S3 to S5 and denotes a process of fusion-bonding the return ores.

In the meantime, in the preheating of the return ores (S2 of FIGS. 3 and 4), after the sintering process, the return ores sorted out by the sorting process are cooled to a room temperature. Thus, to enhance efficiency of a following process of bonding the return ores, the return ores need to be preheated using an additional device such as a rotary kiln.

However, as shown in FIG. 4 described later, the apparatus 1 for treating return ores (in a massive amount) of the present embodiment is capable of preheating the return ores without employing an additional rotary kiln.

For example, referring to FIG. 4, a fire-proof block layer 54 inside an external member 52 of a sealer 50 is heated by heat generated when the plasma heating device 10 is operated in bonding the return ores. Accordingly, the return ores are preheated by a heat-retaining environment between the sealer 50 and the transfer unit 30 while being transported from a position of the transfer unit 30 where the return ores are introduced to the plasma heating device 1. Then, the return ores are heated and fusion-bonded.

Therefore, as shown in FIG. 4, the return ores 2, when introduced to the transfer unit 30, are automatically preheated.

Next, in bonding the return ores (S3 of FIGS. 3 and 4), the preheated return ores are heated half-fused or fully fused using the plasma heating device (reference numeral 10 of FIGS. 4 and 5) which will be described in detail later.

Here, the return ores half-fused or fully fused by plasma are fused together and agglomerated to a grain size of 6 to 50 mm, which is the appropriate size enabling the return ores to be charged into the blast furnace.

Figure 11:
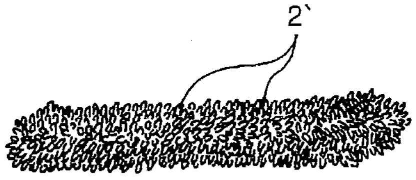
FIG. 11 is a perspective view illustrating a return ore lump agglomerated by a method and apparatus for treating return ores according to an exemplary embodiment of the invention.

For example, FIG. 11 illustrates return ore lump 2' by fusing and agglomerating the return ores generated by the process of returning the return ores of the present invention.

Figure 5:
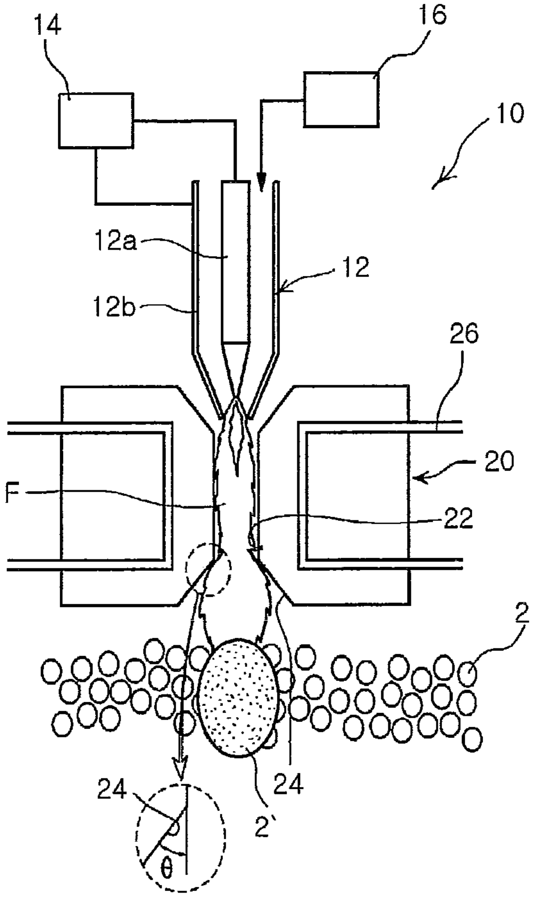
FIG. 5 is a configuration view illustrating a plasma heating device of the present invention.

As shown in FIG. 5, the agglomeration of the return ores by a plasma flame (F of FIG. 5) generated from a torch 12 of the plasma heating device 10 may be regulated by an amount of gas provided to the plasma torch 12 and an inclination angle θ of a flame angle adjusting portion 24 of a plasma torch protection tool 20.

This will be described again later in detail with reference to FIG. 5.

Next, in the heat-retaining (S4 and S5 of FIGS. 3 and 4), the return ore lumps (2' of FIGS. 4 and 11) agglomerated by the plasma heat source in the bonding of the return ores are not air-cooled or water-cooled to maintain strength but heat-retained and slowly cooled while not being in direct contact with external air.

For example, the agglomerated return ore lumps, when cooled using general air cooling or water cooling, may undergo a decrease in strength such as crack occurrence due to rapid change in temperature. Therefore, the return ore lumps may be cooled in a space shielded from external air to maintain strength, using, e.g., the sealer 50 or a warming container (see 'C' of FIG. 13).

The sealer functions as described in the preheating of the return ores.

Here, the heat-retaining for maintaining strength additionally serves to prevent oxidization by blocking the return ores from contact with external air.

Finally, in the screening (S7 of FIGS. 2 to 4), the slowly-cooled return ore lumps are screened using, e.g., a screen. Here, the agglomerated return ore lumps having a grain size of greater than 6 mm, which is a reference size for being put into the blast furnace, are directly charged into the blast furnace. Meanwhile, the return ore lumps having a grain size of 6 mm or less are sent back to the sintering process as shown in FIG. 2 or subjected back to the process of treating the return ores in a massive amount as shown in FIG. 4.

However, as shown in FIG. 4, particularly, the return ore lumps having a grain size of 6 mm or less may be subjected back to the process of supplying the return ores without being reverted to the sintering process.

FIG. 4 illustrates a method and apparatus 1 for treating return ores in a massive amount, capable of treating the return ores in a massive amount.

For example, as shown in FIGS. 3 and 4, the fusion-bonding of the return ores (S6), i.e., treatment of the return ores in a massive amount, includes the preheating (S2) of the return ores sorted out through the sorting process and the bonding (S3) of the return ores by fusing and agglomerating the preheated return ores using the plasma heating device (10 of FIG. 5). Also, the fusion-bonding of the return ores (S6) further includes heat-retaining the agglomerated return ore lumps (S4,5).

That is, the return ores 2 generated in the sintering process of FIG. 2, when fed to the supply hopper 70 through a conveyor 72, can be successively transported therefrom to be subjected to the preheating (S2), thereby enabling the return ores to be treated in a massive amount.

Particularly, the method of treating return ores in a massive amount according to the present embodiment further includes screening (S7) dropped return ores, i.e., screening the return ore lump 2' with a predetermined grain size while checking bonding strength of the return ore lump agglomerated in the bonding of the return ores (S3).

That is, as shown in FIG. 4, in the method of treating the return ores in a massive amount according to the present embodiment, the return ore lumps 2' are dropped off onto a screening unit 80 from a predetermined height. Here, the agglomerated return ore lumps with a grain size of 6 mm or less are returned to the supply hopper 70 and the agglomerated return ore lumps 2' with a grain size of greater than 6 mm are collected on the premise that the return ore lumps 2' are to remain sufficiently strong when charged into the blast furnace again.

Subsequently, the method of treating the return ores of the present embodiment includes heat-retaining the return ores to maintain bonding strength of the agglomerated return ore lump 2' (S4) between the bonding of the return ores (S3) and the screening (S7). Also, the method includes preventing oxidization (S5) by blocking contact with air.

Meanwhile, as shown in FIG. 4, the return ores can be treated in a massive amount according to the present embodiment since the return ores 2 are agglomerated while being successively transported through the transfer unit 30 which will be described in detail, in the apparatus 1 for treating the return ores.

That is, as shown in FIG. 4, the return ores successively fed through the hopper in supplying the return ores (S1) are successively transported to be fusion bonded by the plasma heating device, and the return ores are dropped off to be screened (S7), recovered or discharged, in a continuous process.

Figure 10:
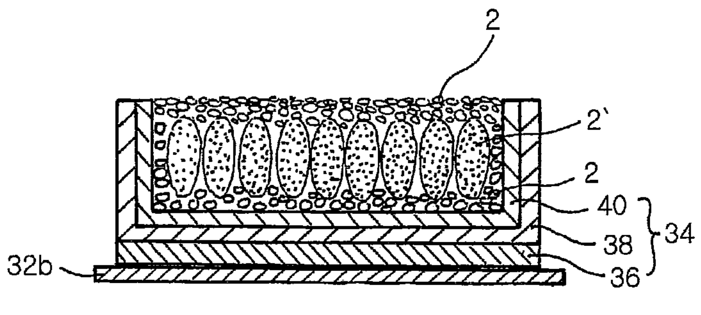
FIG. 10 is a front sectional view illustrating return ores covered over agglomerated return ore lumps to retain heat and prevent oxidization in bonding return ores according to an exemplary embodiment of the invention.

As shown in FIG. 10, when the return ores 2 are covered over the agglomerated return ore lumps 2' which have undergone the fusion bonding of the return ores 2 (S3), the return ores serve as a surrounding wall of the agglomerated return ores. This may allow the agglomerated return ore lumps 2' to retain heat for maintaining strength and prevent oxidization by blocking contact with air.

Figure 9:
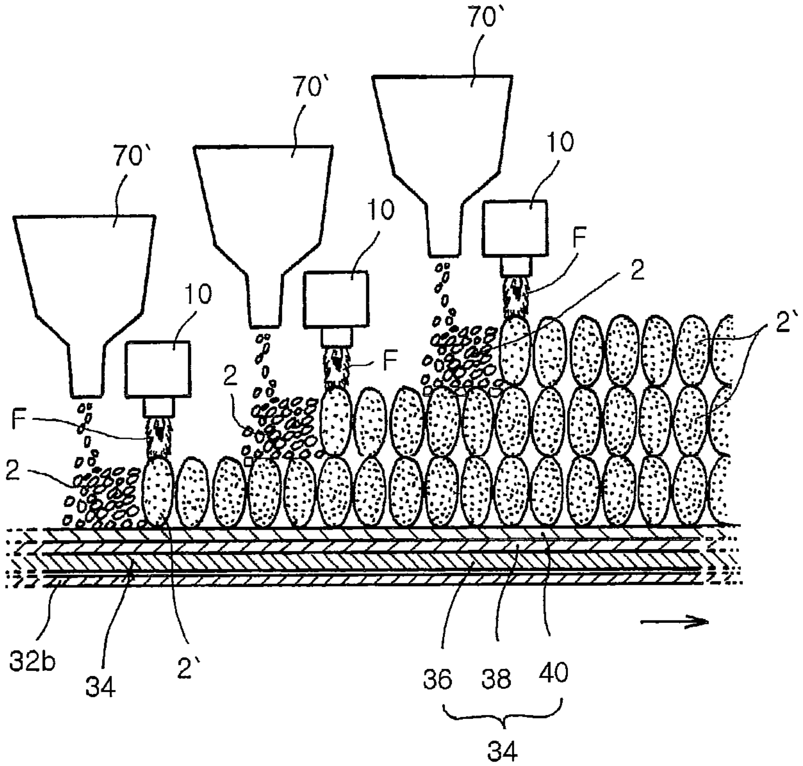
FIGS. 9(*a*) and 9(*b*) are a side sectional view and a front sectional view illustrating a modified example of a transfer unit of FIG. 8, respectively.
Figure 9:
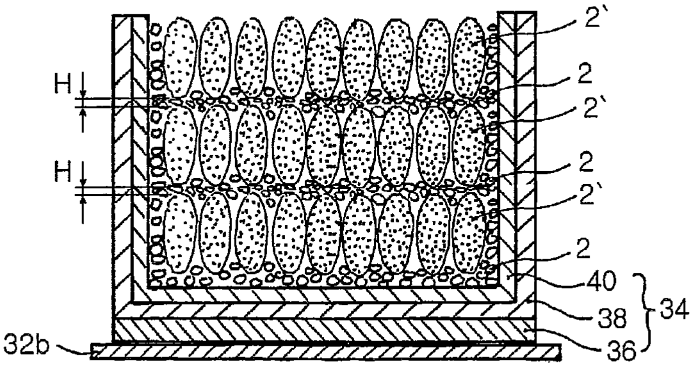

Next, as shown in FIG. 9, the return ores 2 are successively fed in multi-layers to the transfer unit which will be described later. Here, the return ores 2 are fusion bonded gradedly from a lowermost layer to an uppermost layer so that the return ore lumps 2' are treated in multi-layers.

In this case, as shown in FIG. 9(*b*), waste heat among the agglomerated return ore lumps is retained in a 'H' area formed between the lowermost layer and an intermediate layer and between the intermediate layer and the uppermost layer. Therefore, the return ores can be further preheated and more smoothly fusion bonded from the lowermost layer toward the uppermost layer.

Next, a description will be given of an apparatus 1 for treating return ores according to the present embodiment shown in FIGS. 4 to 10, capable of treating the return ores in a massive amount.

First, FIGS. 4 and 5 illustrate a plasma heating device 10 of the apparatus 1 for treating return ores, which substantially enables the return ores to be fusion bonded.

For example, as shown in FIG. 5, the plasma heating device 10 of the present embodiment largely includes a plasma torch 12 and a plasma torch protection tool 20.

Figure 12:
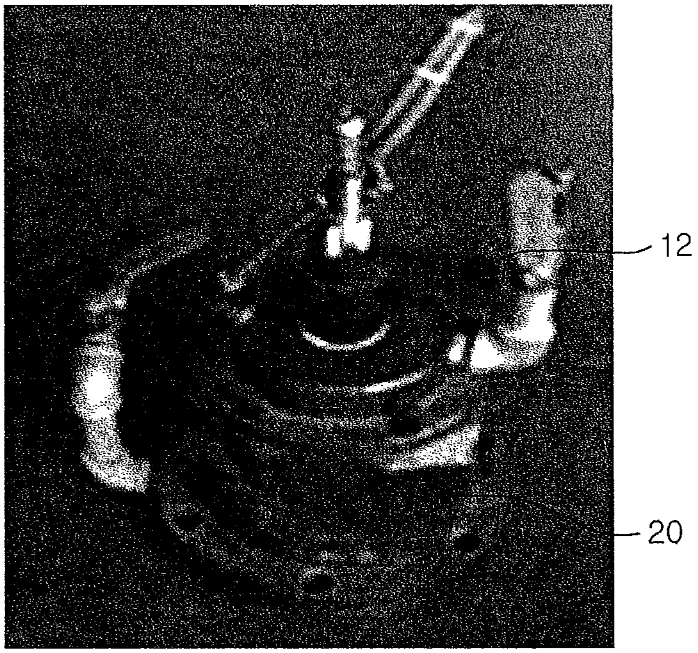
FIG. 12 is a reference picture illustrating a plasma torch and a plasma torch protection tool of a plasma heating device assembled together according to an exemplary embodiment of the invention.
Figure 13:
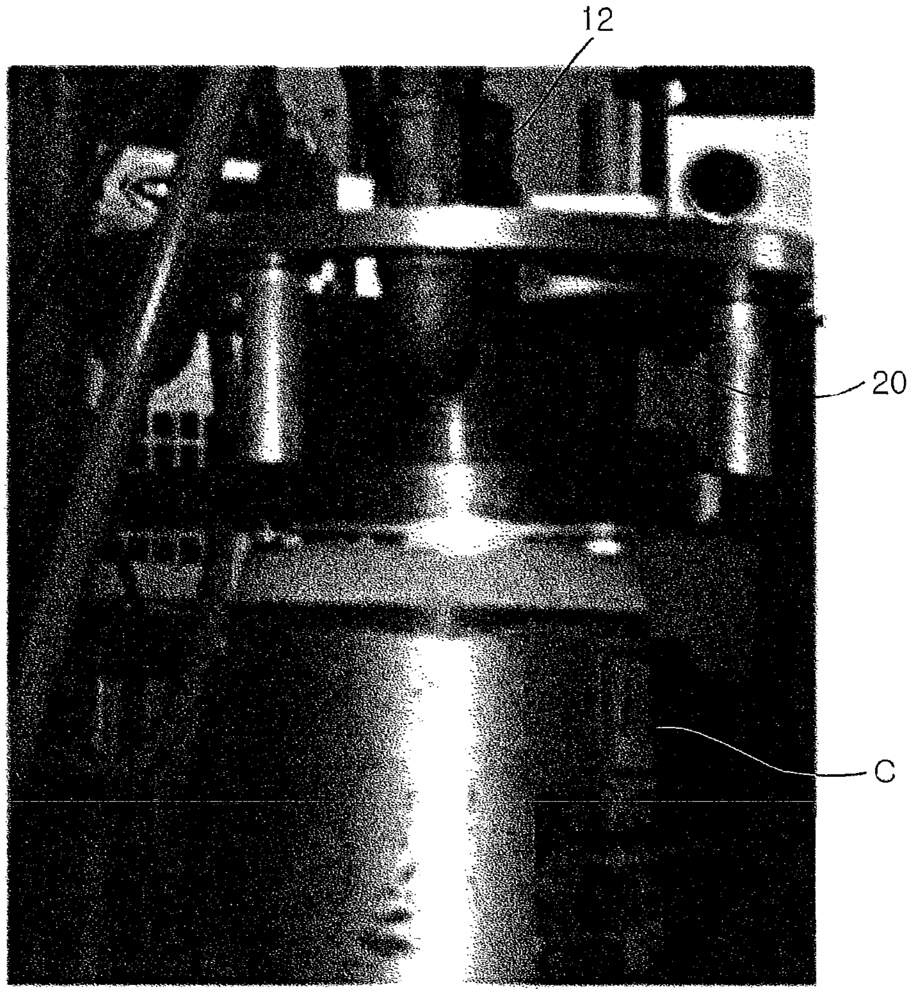
FIG. 13 is a reference picture illustrating a plasma heating device and a container according to an exemplary embodiment of the invention.

FIG. 12 illustrates an actual assembling position of the plasma torch 12 and the plasma torch protection tool 20. FIG. 13 illustrates the plasma torch 12, the plasma torch protection tool 20, and a container C disposed thereunder.

The plasma torch 12 of the plasma heating device 10 is connected to a plasma generator 14 for generating a plasma arc and a gas supplier 16.

Therefore, the arc is generated from the torch 12 by the plasma generator 14. That is, referring to FIG. 5, the arc is generated between an anode 12*a* connected to the plasma generator 14 and the torch serving as a cathode 12*b*. When a gas is fed into the torch by the gas supplier 16, a plasma flame F is formed at a front end of the torch 12, and a length of intensity of the flame F may be adjusted by a feeding amount and intensity of the gas.

Here, the plasma torch 12 can generate heat of a high temperature of 10,000° C. or more. Thus the plasma torch protection tool 20 is installed at a portion of the front end of the torch where the flame is generated in order to protect a tip portion (not shown) of the torch 12 from the high temperature heat and adequately control size and length of the flame F generated from the plasma torch 12.

For example, as shown in FIG. 5, the plasma torch 12 of the present embodiment is joined to a center of an upper part of a housing (not shown) for housing the plasma torch protection tool 20 therein. The plasma torch protection tool 20 is provided in a center with a guide hole 22 for guiding the flame F generated from the front end of the torch 12. Also, a flame angle adjusting portion 24 is formed at an exit of the guide hole of the tool to adjust spraying condition of the flame.

Moreover, a cooling line 26 may be embedded in the plasma torch protection tool 20 to prevent the tip portion of the torch from being impaired by the high temperature heat generated when the plasma heating device is continuously used.

As shown in FIG. 4, this cooling line 26 may be in communication with a cooling water supplier 26'.

Here, as shown in FIG. 5, the flame angle adjusting portion 24 is configured to be inclined at an angle θ of 30° to 70°, particularly 40 to 60°, with respect to a wall thereof in a direction where the exit of the guide hole 22 is widened.

This numerical limitation is based on the premise that with a smaller inclination angle, the return ores 2 are fused by the flame in a narrower and deeper extent while with a greater inclination angle, the return ores are fused in a wider and shallower extent, thereby lowering a maximum heating temperature.

That is, in a case where the inclination angle θ is 30° or less, the agglomerated return ores are fused in a small area, thus posing a problem to yield. On the contrary, in a case where the inclination angle θ is 70° or more, the plasma flame is generated in a wide area but relatively lowered in the heating temperature. Therefore, the return ores have less fusion efficiency from heating and are hardly agglomerated with a grain size of greater than 6 mm. Also, the inclination angle θ of 70° or more prolongs a fusion bonding time of the return ores. Therefore, the inclination angle θ may be in the range of 30° to 70°.

The return ores may have a bonding size, bonding amount and bonding time regulated by adjusting an amount and flow rate of gas fed to the plasma torch 12 and the inclination angle θ of the flame angle adjusting portion 24.

The heat-resistant container C shown in FIG. 13 contains the return ores heated in a half-fused condition. However, in the apparatus for treating return ores in a massive amount as shown in FIG. 4, the container is replaced with the transfer unit 30 for treating the return ores in a massive amount.

Then, as shown in FIG. 4, in the apparatus 1 for treating return ores, the transfer unit 30 substantially enables the return ores to be treated in a massive amount.

Therefore, the apparatus 1 for treating return ores of FIG. 4 basically includes the plasma heating device 10 described with reference to FIG. 5, and further includes the transfer unit 30 for enabling the return ores to be treated in a massive amount.

Figure 6:
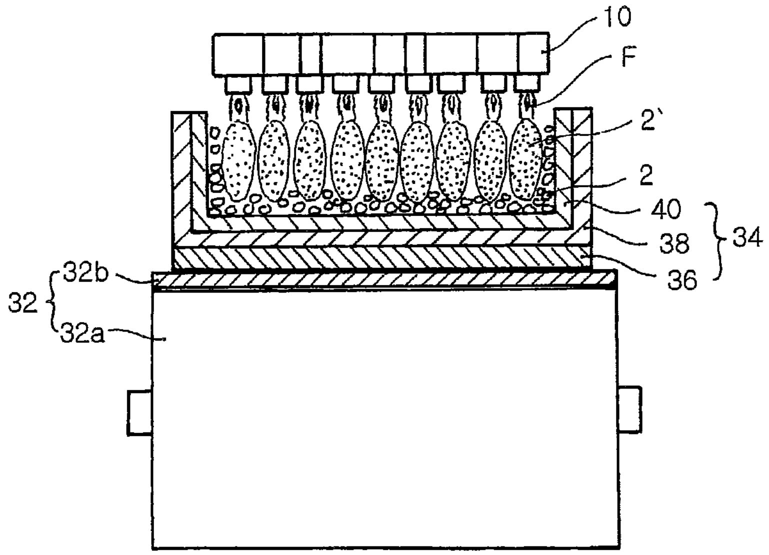
FIG. 6 is a front elevational view illustrating return ores treated using a plurality of plasma heating devices in an apparatus for treating return ores of FIG. 4.
Figure 8:
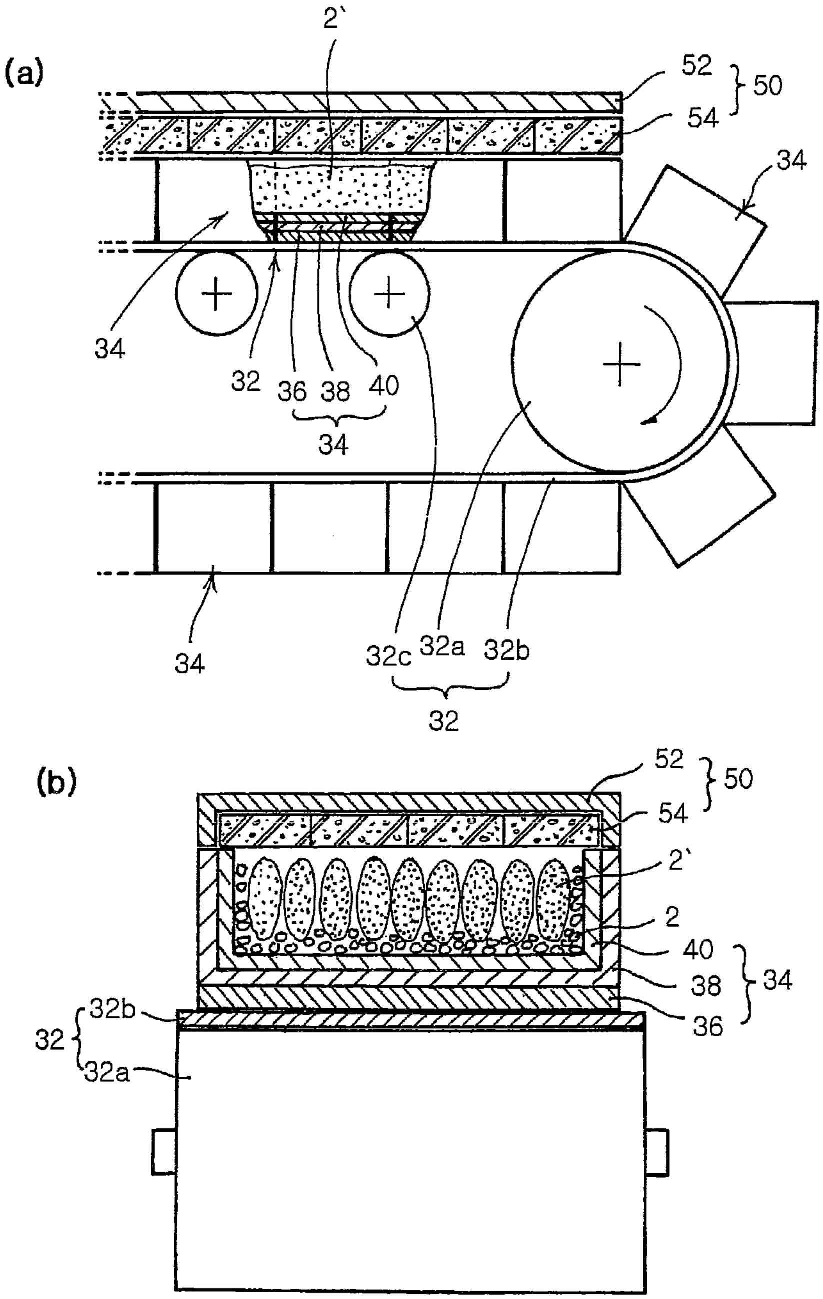
FIGS. 8(*a*) and 8(*b*) are a side sectional view and a front sectional view illustrating a transfer unit of an apparatus for treating return ores of FIG. 4, respectively.

Meanwhile, FIGS. 4, 6 and 8 illustrate the transfer unit 30 of the apparatus of the present embodiment.

As shown in FIGS. 6 and 8, the transfer unit 30 of the present embodiment includes a conveyor 32 and unit blocks 34. The conveyor 32 is moved on an endless track from below the plasma heating device 10. The unit blocks 34 are installed successively on the conveyor 32 to house the return ores 2 therein.

Here, the conveyor 32 may include a conveyor portion 32*b* formed of a belt to maintain strength, a driving roll 32*a* and a transfer roll 32*c* for transferring the conveyor portion on an endless track.

Also, as shown in FIGS. 6 and 8, each of the unit blocks 34 may include a base plate 36 attached to the conveyor portion 32*b* of the conveyor 32, an external material 38 attached onto the base plate 36 to define a space for housing the return ores therein, and a fireproof material 40 attached inside the external material 38.

The fireproof material 40 prevents the unit blocks from being thermally damaged and blocks conduction of heat, thereby retaining heat of the agglomerated return ore lumps 2'.

In addition, as shown in FIG. 8(*a*), the base plate 36 of the unit block 34 needs to have a length or width in accordance with a circumference of the driving roll 32*a* of the conveyor 32.

Accordingly, in the apparatus 1 for treating return ores, the return ores 2, when successively introduced from the supply hopper 70 into the unit blocks 34 assembled with the conveyor 32, are successively agglomerated while passing through the plasma heating device 10.

Figure 7:
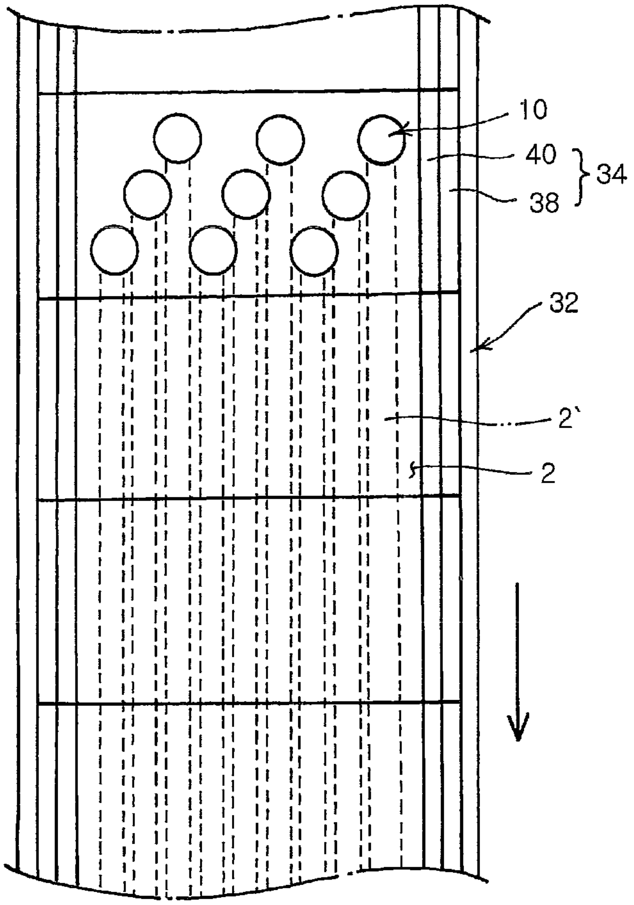
FIG. 7 is a plan view of FIG. 6.

Meanwhile, as shown in FIGS. 6 and 7, the unit blocks 34 may have a width increase corresponding to a length of the plurality of plasma heating devices 10 arranged in a width direction, respectively.

For example, as shown in FIGS. 6 and 7, the nine plasma heating devices 10 may be arranged in three inclined rows each including three heating devices to successively fusion bond the return ores charged into the unit blocks 34 in rows.

Here, a number of the plasma heating devices 10 are arranged adjacent to one another so as to protect heat generated from the plasma heating devices 10 and enhance fusion or heat retention of the return ores.

Next, as shown in FIG. 9, the unit blocks 34 may be increased in height to accommodate the fed return ores in multi-layers from the lowermost layer to an uppermost layer sequentially. Then, equipment for supplying the return ores, i.e., the plurality of supply hoppers 70' and the plurality of plasma heating devices 10 may be installed at a gradually different height with respect to the return ores, respectively from the lowermost layer to the uppermost layer, corresponding to the return ores arranged in multi-layers.

That is, the supply hoppers 70' are arranged in a step configuration and at least one row of the plasma heating devices 10 is arranged behind the supply hoppers 70'. The return ores 2 are first supplied to a bottom of the unit blocks to allow the return ores to be fusion bonded step-wise. This enables the return ores to be treated in a massive amount as shown in FIG. 9(*b*).

Here, the return ore lumps 2' suffer less leakage of retained heat or waste heat, thereby easily retaining heat and maintaining strength.

Further, as shown in FIGS. 4 and 8(*b*), the apparatus 1 for treating return ores of the present embodiment may further include a sealer 50 provided on a top of the transfer unit 30 to have a length adjusted corresponding to at least a length of the transfer unit 30.

Here, the sealer 50 may include an external member 52 and a fireproof block layer 54 provided underneath the external member 52 to retain heat generated from plasma heating devices 10 and heat generated from the fused agglomerated return ores.

Therefore, the external member 52 is attached on both edges of the unit block, i.e., the transfer unit to suppress inflow of air and the fireproof layer 54 inside the external member 52 is heated by heat generated from the plasma heating device.

In the end, as shown in FIG. 4, the return ores 2 introduced into the transfer unit 30 are preheated (S2) in a substantially sealed state initially, and then fusion bonded via the torch flame F of the plasma heating device 10 to be agglomerated (S3). Accordingly, the return ore lumps, when transferred by the transfer unit during a predetermined time, retain heat inside the sealer to keep strength and are blocked from contact with external air to prevent oxidization (S4, 5).

Meanwhile, as shown in FIG. 4, the apparatus 1 for treating return ores 2 further includes a supply hopper 70, a screening unit 80 and a recovery conveyor 90. The supply hopper 70 is disposed above the transfer unit 30 to successively supply the return ores to the transfer unit. The screening unit 80 is disposed below the transfer unit 30 to screen the agglomerated return ore lumps 2' generated from the transfer unit. The recovery conveyor 90 is connected in a reverse direction from the screening unit 80 to the supply hopper 70.

Here, the screening unit 80 plays an important role. For example, the screening unit 80 may be formed of a screen provided with a predetermined height difference from a portion of the transfer unit 30 where the agglomerated return ore lumps are discharged. Accordingly, the return ore lumps 2' are dropped off to be checked in strength, and then the return ore lumps 2' with a grain size of greater than 6 mm are collected.

As shown in FIG. 4, the agglomerated return ore lumps 2' are dropped off on the screens, i.e., the screening unit 80 at 1 to 2 m height from the portion of the transfer unit where the agglomerated return ores are discharged, that is, the position where the unit blocks 34 are shifted from a horizontal direction to a vertical direction by rotation of the driving roll 32*a* of the conveyor 32. The agglomerated return ore lumps sustain impact when dropped off on the screen. Here, the return ore lumps with a grain size of greater than 6 mm are construed to have a high fusion bonding strength, and thus discharged to a discharge conveyor 84 and a collecting bath 86.

However, the fractured agglomerated return ores (2") with a grain size of 6 mm or less can be hardly charged into the blast furnace. Therefore, as shown in FIG. 4, such agglomerated return ores are returned to the supply hopper 70 by the recovery conveyor 72. Here, the return ores with a grain size of 6 mm or less are subjected to the fusion bonding of return ores (S6)(S2,S3,S4,5) after going back through the supplying the return ores (S1).

In the apparatus for treating return ores of the present embodiment, once the return ores are fusion bonded and then agglomerated, the return ores are successively cycled without going back to the sintering process or other processes. Therefore, the apparatus of the present embodiment is more cost effective than a conventional apparatus in which return ores are subjected back to the sintering process.

Meanwhile, as shown in FIG. 4, the constituents of the present embodiment may be installed based on vertical support columns 37 on the base 35.

Also, as shown in FIG. 4, a discharge chute 82 is disposed at a position where the transfer unit is changed in direction and an appropriate amount of the return ore lumps 2' are collected in the discharge chute 82 and then dropped off on the screen, which is the screening unit 80, to be screened, as described above.

Moreover, as shown in FIG. 4, a temperature sensor 42 and a charge coupled device (CCD) camera 44 for sensing a temperature and bonding condition of the return ore lumps 2' are provided at one side of the discharge chute 82. These sensor devices may be connected to an apparatus controller 46.

In addition, the apparatus controller 46 can be electrically connected to a driving source (not shown) of the driving roll 32*a* of the conveyor which is the transfer unit, a plasma generator 14 of the plasma heating device 10 and a gas supplier 16, as indicated with dotted lines denoting a connecting path with the device controller (46 of FIG. 4). Then, the apparatus controller 46 can be controllably driven according to each condition of the agglomerated return ore lumps.

In the apparatus and method for treating the return ores of the present invention, the return ores are half-fused or fully-fused by plasma heating and then bonded and agglomerated to a predetermined grain size, i.e., 6 mm or greater. Accordingly, these return ores (return ore lumps) can be excellently fusion bonded and thus are not easily fractured when put into the blast furnace.

For example, in a sintering plant of a steel-maker, 4000 to 5000 ton/day of return ores are produced. In view of this, the apparatus for treating return ores, particularly the method and apparatus for treating the return ores according to the present invention, which are capable of treating the return ores in a massive amount, allow agglomerated return ores to be produced at a yield of 50%, thereby saving manufacturing costs and operational costs.

In addition, the apparatus and method for treating the return ores of the present invention are applicable to not only a blast furnace process but also an ironmaking process such as a commercially viable FINEX or COREX.

While the present invention has been shown and described in connection with the preferred embodiments, it will be apparent to those skilled in the art that modifications and variations can be made without departing from the scope of the invention as defined by the appended claims.

The invention claimed is:

1. A method of treating return ores using plasma, the method comprising:

providing return ores sorted by sorting return ore particles into return ore particles having a predetermined grain size;

fusing and agglomerating the sorted return ore particles using a plasma torch of a plasma heating device to form agglomerated return ore lumps; and screening the agglomerated return ore lumps with a predetermined grain size, wherein the return ores are successively transferred via a transfer unit and agglomerated by the plasma torch to be treated in a massive amount, and wherein the transfer unit comprises: a conveyer moved on an endless track and disposed directly below the plasma heating device; and unit blocks disposed successively on the conveyer to house the return ore therein.

2. The method of claim 1, further comprising pre-heating the return ores fed through the sorting process before bonding the return ores.

3. The method of claim 1, further comprising heat-retaining a agglomerated return ore lump by slowly cooling the return ore lump after bonding the return ores to maintain bonding strength, and blocking the return ore lump from contact with air to prevent oxidization thereof.

4. The method of claim 1, wherein the return ore particles comprise sintered ore particles with a grain size of 6 mm or less sorted through the sorting process after sintering is completed or return ore particles put into a melter-gasifier of an ironmaking process using non-coking coal and iron ore fines.

5. The method of claim 1, wherein the screening the agglomerated return ore lumps comprises dropping the return ore lumps from a predetermined height onto a screen, determining bonding strength of the return ore lumps, collecting the return ore lumps with a grain size of greater than 6 mm and recovering the return ore lumps with a grain size of 6 mm or less for the providing return ores.

6. The method of claim 1, wherein the plasma heating device comprises a plurality of plasma heating devices arranged in rows to treat the return ores in a massive amount.

7. The method of claim 1, wherein further return ores are covered over agglomerated return ore lumps after the bonding the return ores to retain heat and prevent oxidization thereof.

8. The method of claim 1, wherein the return ores are successively fed in multi-layers in such a way that the return ores are fusion-bonded step-wise from a lowermost layer to an uppermost layer to be treated in a massive amount.

* * * * *